(12) United States Patent
Park

(10) Patent No.: US 7,019,787 B2
(45) Date of Patent: Mar. 28, 2006

(54) APPARATUS AND METHOD FOR AUTOMATICALLY SELECTING CAPTION LANGUAGE

(75) Inventor: Il Seong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 10/092,702

(22) Filed: Mar. 5, 2002

(65) Prior Publication Data
US 2002/0140863 A1 Oct. 3, 2002

(30) Foreign Application Priority Data
Mar. 30, 2001 (KR) .............................. 2001-16891

(51) Int. Cl.
H04N 11/00 (2006.01)
H04N 7/00 (2006.01)

(52) U.S. Cl. ..................................... 348/468

(58) Field of Classification Search ........ 348/461–468, 348/563–564, 589; H04N 7/00, 11/00
See application file for complete search history.

(56) References Cited

FOREIGN PATENT DOCUMENTS

EP 0744866 A2 * 11/1996

* cited by examiner

Primary Examiner—Michael H Lee
(74) Attorney, Agent, or Firm—Lee, Hong, Degerman, Kang & Schmadeka

(57) ABSTRACT

An apparatus for automatically selecting caption language, includes a receiving unit for receiving a data stream, an input control unit with which a user can select a caption language and a caption selection unit for automatically selecting the caption language among pluralities of languages included in the data stream and displaying the caption language on a screen, to continuously output captions corresponding to the language selected by a user in advance in caption broadcasting of a digital TV. Accordingly, with the present invention, the user can watch the preferred caption language conveniently by automatically searching the caption service ID of the selected language from the image signal when the user selects the preferred language among the caption languages in the caption menu of the TV in advance and displaying the corresponding language on the screen.

2 Claims, 3 Drawing Sheets

APPARATUS AND METHOD FOR AUTOMATICALLY SELECTING CAPTION LANGUAGE

BACKGROUND OF THE INVENTION

1. Field of the Invention

The present invention relates to an apparatus and method for automatically selecting caption language and particularly, to an apparatus and method for automatically selecting caption language for continuously outputting a caption language of a selected language that a user selected in advance in caption broadcasting of a digital TV.

2. Description of the Background Art

Generally, caption broadcasting of an analog TV can provide maximum four caption services, such as Korean, Japanese, Chinese, English and the like and caption broadcasting of a digital TV can provide maximum sixty three services.

FIG. 1 is a block diagram showing an apparatus for caption language selection of a conventional TV. As shown in the drawing, a conventional apparatus 100 for selecting a caption language of a conventional TV includes a receiving unit 110 for receiving an image signal, input control unit 120 for selecting a caption service according to the caption language selected by a user and an output unit 130 for displaying the image signal and selected caption language on a screen according to a control signal of the control unit.

The conventional apparatus for automatically selecting caption language will be described with reference to FIGS. 1 to 3.

The receiving unit 110 receives an image signal received together with the caption language which will be provided to a user and the output unit 130 displays the received image signal on the screen. Simultaneously, the input control unit 120 separately selects only a predetermined caption language selected by the user and transmits the language to the output unit 130. The output unit 130 displays the selected caption language on the screen together with the image signal.

Here, the caption language which can be selected by a user with an input apparatus (not shown) is composed by a line selection, such as CC(Closed Caption)1 shown in FIG. 2. Namely, when English caption is allotted to the CC1, a caption extraction unit (not shown) extracts only a predetermined line corresponding to the CCl and outputs the line to the output unit 130 since image signal contains the caption language on a predetermined line.

However, when the broadcasting program is changed, the caption language contained in the image signal of the broadcasting program can be transmitted being contained on the other line. Namely, Korean caption is transmitted through the line containing the conventional English caption and English caption can be transmitted through the other line. In this case, the user selects the CC1 (since the CC1 is selected currently) since the user wanted to receive English caption service. Actually, the Korean caption is displayed and accordingly, the user can watch the English caption by selecting the line corresponding to the English caption again. However, the user cannot recognize with which CC number the English caption is selected among CC2 to CC4 in caption service menu and accordingly, there was a disadvantage that the user must search the CC number changing all the numbers in the caption service menu.

Also, in case of a digital TV, since sixty three caption services are contained in the stream of the digital image signal, the user must search the preferred caption language whenever the broadcasting program is changed, thus to cause inconvenience and spend much time.

SUMMARY OF THE INVENTION

Therefore, the present invention provides an apparatus and method for automatically selecting caption language, capable of searching a caption service ID of the selected language from the image signal and displaying the corresponding language on a screen so that the user can watch the caption language conveniently if the user sets the preferred language in the caption menu of a TV in advance.

To achieve these and other advantages and in accordance with the purpose of the present invention, as embodied and broadly described herein, there is provided an apparatus for automatically selecting caption language, including a receiving unit for receiving a data stream, an input control unit with which the user can select a caption language and a caption selection unit for automatically selecting the caption language among the plurality of languages included in the data stream and displaying the caption language on a screen.

Also, to achieve these and other advantages and in accordance with the purpose of the present invention, as embodied and broadly described herein, there is provided a method for automatically selecting caption language, including the steps of extracting a caption data and caption descriptor from inputted data stream, extracting a caption ID from the caption descriptor according to a caption language language that a user selected and extracting the caption language corresponding to the caption service ID from the caption data and displaying the language.

The foregoing and other, features, aspects and advantages of the present invention will become more apparent from the following detailed description when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

With the present invention, the caption data included in the inputted broadcasting stream is extracted and the caption descriptor is extracted from the broadcasting stream when the user selects the preferred caption language. Then, the caption language selected by the user can be automatically displayed on a screen even if the broadcasting program is changed, by extracting the caption service ID from the caption descriptor and displaying only the caption language corresponding to the caption service ID on the screen.

Hereinafter, reference will now be made in detail to the preferred embodiments of the present invention, examples of which are illustrated in the accompanying drawings.

Figure 1:
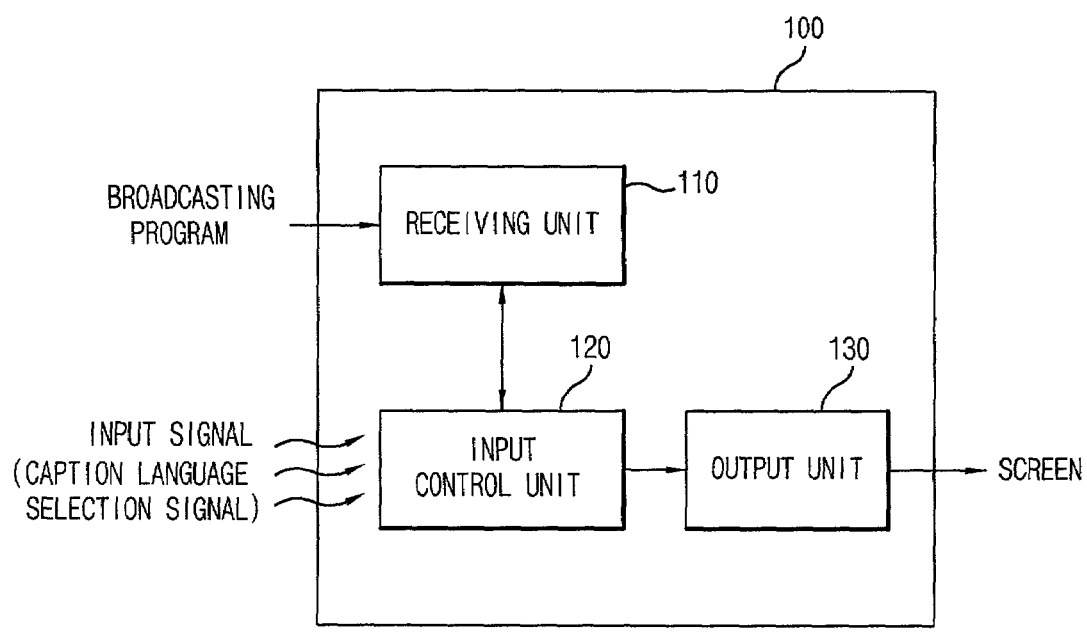
FIG. 1 is a block diagram showing an apparatus for caption language selection of a conventional TV.
Figure 2:
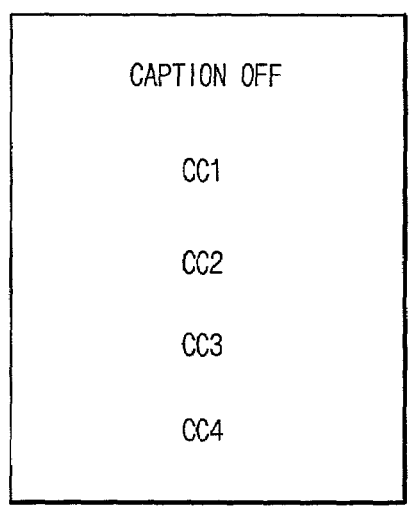
FIG. 2 is an exemplary view showing a conventional caption menu.
Figure 3:
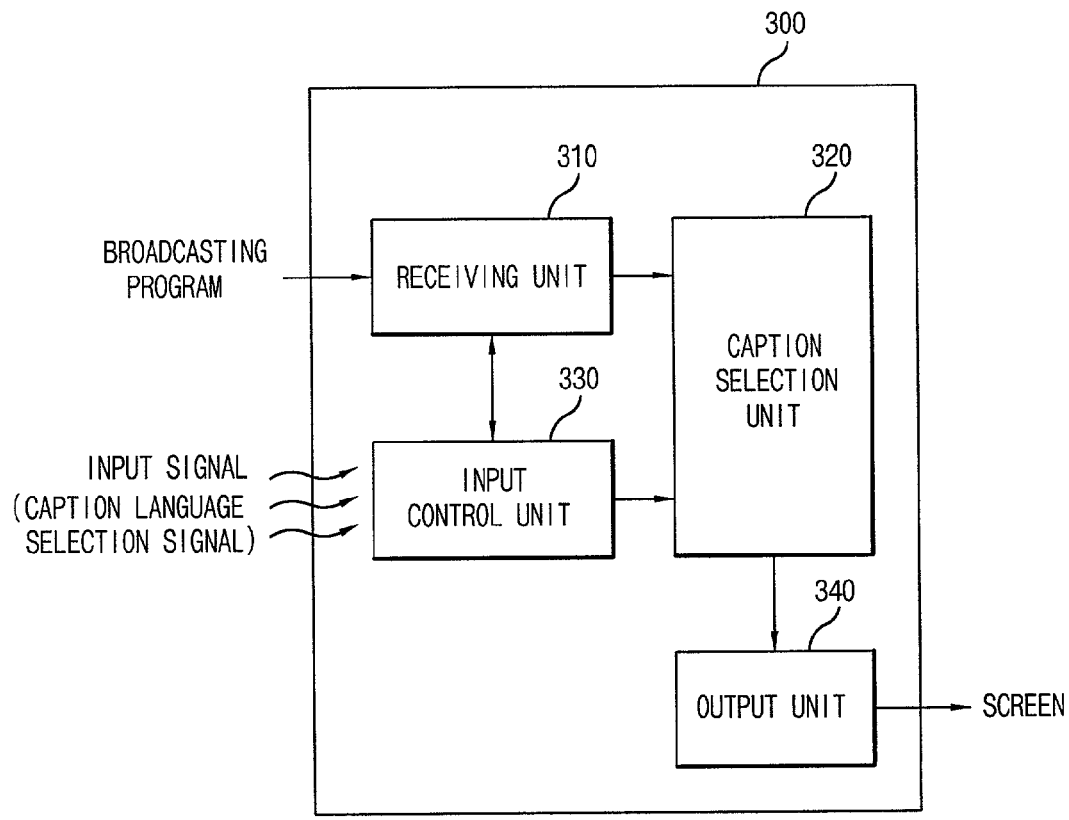
FIG. 3 is a block diagram showing the composition of a digital TV in accordance with the present invention.

FIG. 3 is a block diagram showing the composition of a digital TV in accordance with the present invention. As shown in the drawing, the digital TV 300 includes a receiving unit 310 for receiving a broadcasting stream, an input control unit 330 for transmitting a caption language into the caption selection unit 320 when the user selects the caption language by an input device (not shown) and the caption selection unit 320 for automatically selecting the caption language included in the broadcasting stream according to the caption language selected by the user and an output unit 340 for displaying the selected caption language on the screen.

The digital TV with the above composition will be described as follows.

Figure 4:
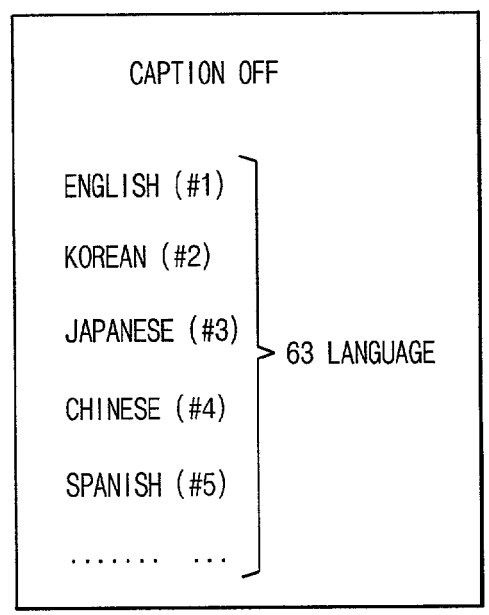
FIG. 4 is an exemplary view showing a caption menu of the digital TV in accordance with the present invention.

First, the input control unit 330 transmits the caption selected by the user with an input device (e.g. a remote control) into the caption selection unit 320. Also, when the receiving unit 310 receives the broadcasting stream and transmits the stream into the caption selection unit 320 connected with the receiving unit 310 by receiving the broadcasting signal, as shown in FIG. 4, the caption selection unit 320 automatically extracts the caption language selected by the user from the caption language menu (sixty three caption languages) from the broadcasting stream and the output unit 340 displays the caption language on the screen.

Figure 5:
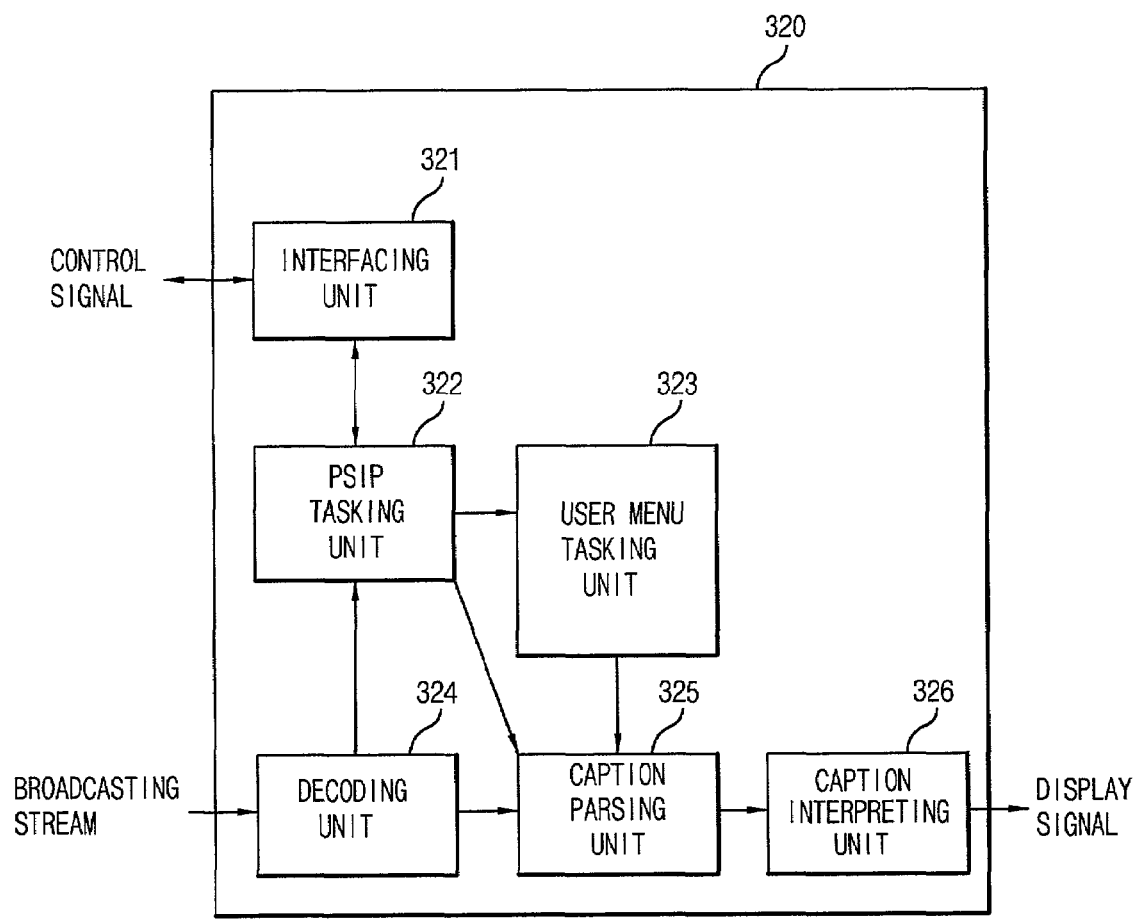
FIG. 5 is a block diagram showing the composition of a caption language selection unit of the digital TV in accordance with the present invention.

FIG. 5 is a block diagram showing the composition of the caption selection unit of the digital TV in accordance with the present invention. As shown in the drawing, the caption selection unit 320 includes an interfacing unit 321 for receiving signals from the input control unit 330, a user menu tasking unit 323 for selecting the caption language corresponding to the input signal whenever the broadcasting program is changed or the caption language setting is turned on or off, a decoding unit 324 for decoding the broadcasting stream and transmitting the user data in the decoded broadcasting stream into a Program and System Information Protocol tasking unit (PSIP tasking unit) 322 and transmitting the caption data into a caption parsing unit 325, the PISP tasking unit 322 for extracting a caption descriptor from the user data and transmitting the descriptor into the user menu tasking unit 323 and caption parsing unit 325, the caption parsing unit 325 for transmitting a caption data transmitted from the decoder 324 and a caption service number corresponding to the caption language selected in the user menu tasking unit 323 into a caption interpreting unit 326, and the caption interpreting unit 326 for extracting the caption language corresponding to the caption service number and displaying the language on the screen through the output unit 340.

The caption selection unit 320 of the digital TV, with the above composition will be described in detail with reference to the accompanied drawing as follows.

Firstly, the input control unit 330 transmits the caption language inputted with the input device (not shown) into the interfacing unit 321. Then, the interfacing unit 321 transmits the caption language into the user menu tasking unit 323. Also, the decoding unit 324 transmits the user data region into the PSIP tasking unit 322 by decoding the broadcasting stream transmitted from the receiving unit 310 and transmits the caption data into the caption parsing unit 325 by loading the caption data which begins with 0x000001B2 among the streams in the user data region, in the message queue. At this time, the broadcasting stream includes the user data for the user and the user data includes the caption data and caption descriptor for caption service.

The PSIP tasking unit 322 extracts the caption descriptor (which contains information such as the kind of language of the corresponding caption service and rate of perpendicular and horizontal divisions of the screen) among the user data transmitted from the decoder and then transmits the descriptor into the user menu tasking unit 323 by loading the descriptor in the Event Information Table (EIT) of the PSIP. At this time, the PSIP tasking unit 322 transmits the caption descriptor into the user menu tasking unit 323 whenever the broadcasting program is changed so that the user menu tasking unit 323 can recognize.

Accordingly, the user menu tasking unit 323 receives the caption descriptor from the PSIP tasking unit 322 whenever the broadcasting program is changed or the caption language setting is turned on or off and transmits the selected language information into the caption parsing unit 325.

Then, the caption parsing unit 325 extracts the caption service ID corresponding to the selected language in the user menu tasking unit 322 from the caption descriptor and then transmits the ID to the caption interpreting unit 326 together with the caption data received from the decoding unit 324.

The caption interpreting unit 326 extracts the language corresponding to the caption service ID from the caption data and properly displays the language on the screen through the output unit 340. Accordingly, the user can watch the predetermined caption language on the screen by setting the preferred caption language, even if the program is changed.

Through the above process, the user can watch the TV in the predetermined caption language even if the program is changed.

Also, as another embodiment of the present invention, the caption language can be provided by loading the program as in the above described operation by composing the caption selection unit 320 contained in the digital TV 300 as a processor.

As described above, with the present invention, the user can watch the preferred caption language conveniently by automatically searching the caption language service ID of the selected language from the image signal when the user selects the preferred language among the caption languages in the caption menu of the TV in advance and displaying the corresponding language on the screen.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for automatically selecting and displaying a caption of a desired caption language from a received digital television (DTV) transmission, comprising:

a receiving unit for receiving a data stream of the DTV transmission;

an input control unit for receiving a caption language selection selected by a user;

a decoding unit for decoding the received data stream;
a PSIP (Program and System Information Protocol) tasking unit for extracting a caption descriptor from the decoded data stream;
a user menu tasking unit for receiving the caption descriptor from the PSIP tasking unit whenever a broadcasting program is changed or a caption language setting is turned on or off by the user, and transmitting selected language information into a caption parsing unit;
the caption parsing unit for extracting a caption service number corresponding to the caption language selection from the caption descriptor; and
a caption interpreting unit for extracting caption data of the selected language corresponding to the selected caption service number and displaying the caption in the selected language on the screen, wherein the PSIP tasking unit, whenever a received program is changed, extracts and transmits the extracted caption descriptor of the received program to the user menu tasking unit.

2. A method for automatically selecting and displaying a caption of a desired caption language from a received digital television (DTV) transmission, the method comprising:
   extracting user data from a PSIP (Program and System Information Protocol) data stream of the DTV transmission;
   extracting caption data and a caption descriptor from the user data whenever a broadcasting program is changed or a caption language setting is turned on or off by the user;
   receiving a caption language selection selected by a user;
   extracting a caption service ID corresponding to the caption language selection selected by the user from the caption descriptor; and
   extracting the caption language corresponding to the caption service ID from the caption data and displaying the language.

* * * * *